United States Patent Office 3,294,630
Patented Dec. 27, 1966

3,294,630
O,O-DIETHYL-O-(3-ETHOXYCARBONYLMETHYL-4 - METHYLCOUMARIN - 7 - YL)PHOSPHOROTHIOATE INSECTICIDE
Gerald Sydney Poll and Malcolm Henry Black, both of Berkhamsted, England, assignors to Cooper, McDougall & Robertson Limited, Chemical Works, Berkhamsted, Hertfordshire, England, a British company
No Drawing. Filed Nov. 19, 1964, Ser. No. 412,306
Claims priority, application Great Britain, Nov. 20, 1963, 45,760/63
10 Claims. (Cl. 167—33)

This invention relates to organo-phosphorus compounds, their preparation and formulations containing these suitable for controlling arthropod pests. More particularly, this invention relates to 3,4-substituted coumarin esters of thiophosphoric acid.

The development by arthropod pests of resistance to various pesticides has become a common feature in recent years. One such pest, *Boophilus microplus* (canestrini, 1887), the one-host tick, is parasitic on cattle and horses, and is of great economic importance in major cattle ranching areas in Australia, South and Central America and elsewhere.

A strain of *B. microplus*, identified as the M strain, has been found resistant to a large number of pesticides including organophosphorus pesticides such as O,O-diethyl-O - (3 - chloro-4-methylcoumarin-7-yl)phosphorothioate (asuntol), O,O-diethyl-O-p-nitrophenyl phosphorothioate (parathion), and O,O-diethyl-S-(p-chlorophenylthiomethyl)phosphorodithioate (trithion). It is known that once a strain of an arthropod pest arises which is resistant to a particular pesticide, then it is likely that the resistance will increase with further use of the pesticide for its control. In consequence, the search continues for new pesticides against which a pest has no resistance.

The applicants have found that a thiophosphoric acid ester of Formula I in which R is a methyl radical

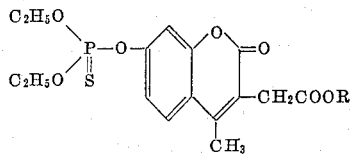

is as active against *B. microplus* (M strain) as it is against another strain of the same organism (Z strain) which is susceptible to organophosphorus pesticides. From Table I below, it can be seen that the methyl ester of Formula I is toxic to *B. microplus* (M strain) at the same concentration as it is toxic to *B. microplus* (Z strain). On the other hand a greater concentration of asuntol, Parathion or Trithion is required to kill *B. microplus* (M strain) than is required to kill *B. microplus* (Z strain). In the table, the $LC_{50}$ is the dose required to kill 50% of the organisms under test. The ratio of these $LC_{50}$'s is expressed as the "factor of resistance" and is a measure of the degree to which the pest is resistant to the particular pesticide.

TABLE I
[$LC_{50}$ and factor of resistance of larvae of a M strain and Z strain of *B. Microplus* compared in laboratory in vitro tests]

| Compound | Formulation | Z strain $LC_{50}$ (percent) | M strain $LC_{50}$ (percent) | Factor of Resistance |
|---|---|---|---|---|
| Trithion | 60% W.M.C | 0.00014 | 0.0087 | 62 |
| Parathion | 10% W.M.C | 0.00017 | 0.0017 | 10 |
| Asuntol | 50% W.P | 0.0011 | 0.0052 | 5 |
| Asuntol | 10% W.M.C | 0.00012 | 0.00021 | 1.8 |
| Compound of formula (I) | | 0.00050 | 0.00041 | 1 |

Key: W.M.C.—water miscible concentrate; W.P.—wettable powder.

The ethyl ester for Formula I is also active against *B. microplus* (M strain) and (Z strain), but it does not have a resistance factor of 1. The compound is however most useful in formulating the methyl ester as a miscible oil concentrate.

In addition to being active against *B. microplus*, the compounds of Formula I are toxic to other arthropod pests and particularly to members of the Insecta and Arachnida. For example, they exhibit pesticidal properties in screening tests against *Lucilia* spp. (for example *L. sericata*), houseflies (*Musca domestica* L.), mosquitoe larvae (*Aedes aegypti* L.) and Rhipicephalus spp. (for example *R. evertsi*).

The esters of Formula I may be made by any of the conventional methods for making phosphorothioate esters. For example by the reaction between a phosphorohalogenothionate of Formula II in which Z is a halogen atom (preferably chlorine)

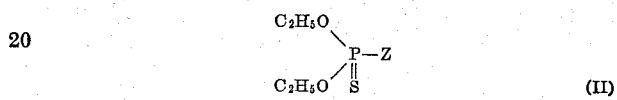

and a coumarin compound of Formula III

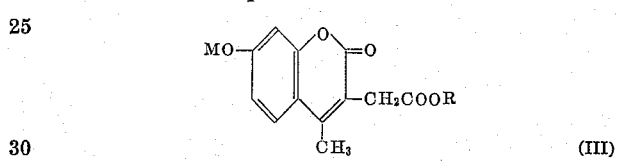

in which M is a hydrogen atom or an alkali metal. The reactants may be heated together in the presence of a liquid medium which may be either an organic solvent or water, or a miscible mixture thereof. Conveniently methyl ethyl ketone, methyl isobutyl ketone, acetone, benzene or water may be used; and a catalyst, for example finely divided copper may be included in the reaction mixture. If the compound of Formula III is a 7-hydroxy-coumarin derivative, an acid acceptor such as an alkali carbonate, triethylamine or lutidine is included in the reaction mixture.

An ester of Formula I may be used to combat arthropod pests preferably in a pesticidal formulation containing the ester and a carrier therefor, and these may be made by admixture according to techniques well known in the art of presentation of organo-phosphorus pesticides. A formulation may be a dispersible or wettable powder or a miscible oil concentrate and these may be mixed with water to provide a spray or drench for application to the pests. An ester may also be presented in granules, a dust, or a thermoplastic or a thermoset resin, or with a propellant in a pressure pack or aerosol prepared by cold or pressure techniques. Among the carriers which may be used in the formulations, are diluents, stabilising, thickening, emulsifying, dispersing, wetting and surface active agents, and solvents.

The methyl ester of Formula I is not very soluble in the majority of organic solvents and a sufficiently concentrated miscible oil formulation of the compound is difficult to make. However the applicants have found that by combining a proportion of the ethyl ester with the methyl ester, preferably in the proportion 1/1 by weight, it is possible to prepare a satisfactory miscible oil formulation which also has the desired activity against the M strain of *Boophilus microplus*.

This invention therefore provides:

(1) A thiophosphoric acid ester of Formula I.
(2) A method of making an ester of Formula I as hereinbefore stated.
(3) A method for the control of arthropod pests, particularly members of the Arachnida and Insecta, comprising the use of an ester of Formula I.

(4) A pesticidal formulation containing an ester of Formula I and a carrier therefor.

(5) A method of making the formulation comprising admixture of the ester and the carrier.

The following are examples of the invention.

EXAMPLE I

*Preparation of dimethyl α-acetyl succinate*

Sodium (1 gm. atom) was dissolved in dry methanol (400 ml.). When the sodium had dissolved completely, methyl acetoacetate (1.5 mol.) was introduced slowly with mechanical stirring. Methyl chloroacetate (1 mol.) was then added slowly over a period of an hour and the reaction mixture then refluxed for 4–6 hours. (At this point the reaction mixture should no longer give an alkaline reaction with moist litmus.)

After cooling, the precipitated sodium chloride was removed by filtration and was washed with two 50 cc. portions of dry methanol. The alcohol was removed by distillation and the resulting residue fractionated under reduced pressure. The fraction boiling at 84° C. at 0.4 mm. Hg was collected.

*Preparation of 3-methoxycarbonylmethyl-4-methyl-7-hydroxycoumarin*

An ice cooled, stirred solution of resorcinol (1 mol.) in dimethylacetosuccinate (1 mol.) was treated dropwise with phosphoryl chloride (0.5 mol.). When addition was completed the reaction mixture was allowed to stand overnight. The resulting solid was broken up and triturated with a large volume of water, filtered, washed thoroughly with water and finally recrystallised from aqueous methanol, to yield the product, melting point 195° C.

Anhydrous potassium carbonate (0.11 mole) was added to a stirred solution of 3-methoxycarbonylmethyl-4-methyl-7-hydroxycoumarin (0.1 mole) in methylethyl ketone and the mixture heated for 60 minutes. After cooling to about 40° C., O,O-diethyl phosphorochloridothionate (0.1 mole) was added over a period of 30 minutes and the mixture heated and stirred for 180 minutes. The mixture was then cooled, insoluble material removed by filtration, and the solvent removed by distillation. The residue was dissolved in benzene (250 ml.) and the resultant solution washed successively with an aqueous sodium carbonate solution (5% w./w.), water and a saturated aqueous solution of sodium chloride. The benzene was evaporated to leave an oil, which on crystallisation from di-isopropylether afforded O,O-diethyl-O-(3-methoxycarbonylmethyl - 4-methylcoumarin-7-yl)phosphorothionate, melting point 67–68° C.

EXAMPLE 2

By the procedure outlined in Formula I, there was prepared O,O - diethyl-O-(3-ethoxycarbonylmethyl-4-methylcoumarin-7-yl)phosphorothioate from 3-ethoxycarbonylmethyl - 4 - methyl-7-hydroxycoumarin and O,O-diethyl phosphorochloridothionate.

EXAMPLE 3

A miscible oil concentrate was made from the following ingredients:

| | Percent by weight |
|---|---|
| O,O-diethyl-O-(3-methoxycarbonylmethyl-4-methylcoumarin-7-yl)-phosphorothioate | 19.4 |
| Solvent comprising α-methylnaphthalenes | 68.1 |
| Emulsifier | 12.5 |

The emulsifier comprises an alkylarylpolyethylene oxide condensate and the calcium salt of an alkylaryl sulphonate. The ester is dissolved in the solvent and the emulsifier added.

EXAMPLE 4

In the manner described in Example 3 the following miscible oil concentrate was made:

| | Percent by weight |
|---|---|
| O,O - diethyl - O - (3 - methoxycarbonylmethyl-4-methylcoumarin - 7 - yl)phosphorothioate | 5.0 |
| Solvent comprising α-methylnaphthalenes | 83.0 |
| Emulsifier (as in Example 3) | 12.0 |

EXAMPLE 5

In the manner described in Example 3, the following miscible oil concentrate was prepared:

| | Percent by weight |
|---|---|
| O,O - diethyl - O - (3 - methoxycarbonylmethyl-4-methylcoumarin - 7 - yl)phosphorothioate | 10.5 |
| O,O - diethyl - O - (3 - ethoxycarbonylmethyl - 4-methylcoumarin - 7 - yl)phosphorothioate | 10.5 |
| Calcium dodecyl benzene sulphonate | 4.5 |
| Emulsifier | 1.1 |
| Non-ionic surface active agent | 6.9 |
| High boiling aromatic solvent | 66.5 |

The emulsifier was a liquid non-ionic polyalkylene glycol ether.

What we claim is:

1. A thiophosphoric acid ester of the formula

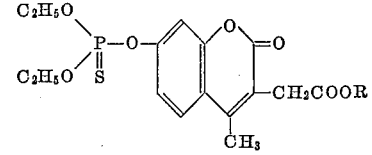

wherein R is selected from the class consisting of methyl and ethyl.

2. O,O - diethyl - O - (3 - methoxycarbonylmethyl-4-methylcoumarin-7-yl)phosphorothioate.

3. O,O - diethyl - O - (3 - ethoxycarbonylmethyl-4-methylcoumarin-7-yl)phosphorothioate.

4. A pesticidal composition containing

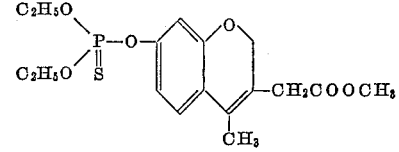

and a carrier therefor.

5. A pesticidal formulation comprising a thiophosphoric acid ester as defined in claim 1 together with a carrier therefor.

6. A pesticidal formulation as claimed in claim 5 wherein the carrier is a surface active agent.

7. A pesticidal formulation as claimed in claim 6 wherein the carrier further comprises an organic solvent.

8. A pesticidal formulation as claimed in claim 5, wherein the thiophosphoric acid ester is present in an amount between 5 and 20 percent by weight.

9. A pesticidal formulation as claimed in claim 6 wherein the thiophosphoric acid ester is present in an amount between 5 and 20 percent by weight.

10. A pesticidal formulation as claimed in claim 7, wherein the thiophosphoric acid ester is present in an amount between 5 and 20 percent by weight.

References Cited by the Examiner

UNITED STATES PATENTS

| 2,624,745 | 1/1953 | Schrader | 260—343.2 |
| 2,748,146 | 5/1956 | Schrader | 260—343.2 |
| 3,061,613 | 10/1962 | Newallis | 260—343.2 |
| 3,221,027 | 11/1965 | Foster | 167—33 |

JULIAN S. LEVITT, *Primary Examiner.*

JEROME D. GOLDBERG, *Assistant Examiner.*